(12) United States Patent
Conrad et al.

(10) Patent No.: US 7,179,314 B2
(45) Date of Patent: Feb. 20, 2007

(54) VACUUM CLEANER

(75) Inventors: Wayne Ernest Conrad, Hampton (CA); Helmut Gerhard Conrad, Hampton (CA)

(73) Assignee: Polar Light Limited, Hong Kong (HK)

( * ) Notice: Subject to any disclaimer, the term of this patent is extended or adjusted under 35 U.S.C. 154(b) by 236 days.

(21) Appl. No.: 10/824,491

(22) Filed: Apr. 15, 2004

(65) Prior Publication Data

US 2005/0028675 A1 Feb. 10, 2005

Related U.S. Application Data

(63) Continuation of application No. 10/043,337, filed on Jan. 14, 2002, now Pat. No. 6,740,144, which is a continuation of application No. 09/478,891, filed on Jan. 7, 2000, now Pat. No. 6,383,266, which is a continuation-in-part of application No. 09/227,712, filed on Jan. 8, 1999, now Pat. No. 6,238,451.

(51) Int. Cl.
*B01D 45/12* (2006.01)

(52) U.S. Cl. .................. 55/321; 55/337; 55/343; 55/349; 55/459.1; 55/DIG. 3; 15/350; 15/353

(58) Field of Classification Search ............ 55/337, 55/459.1, 321, 343, 349, DIG. 3; 15/350, 15/353

See application file for complete search history.

(56) References Cited

U.S. PATENT DOCUMENTS

| | | | |
|---|---|---|---|
| 450,372 A | 4/1891 | Morse | |
| 883,413 A | 3/1908 | Mahony | |
| 1,023,082 A | 4/1912 | Kluge | |
| 1,127,896 A | 2/1915 | Keller | |
| 1,369,939 A | 3/1921 | Shaffer | |
| 1,752,231 A | 3/1930 | Clarkson | |
| 1,759,947 A | 3/1930 | Lee | |
| 1,798,510 A | 3/1931 | Winkslow et al. | |
| 1,826,798 A | 10/1931 | Lee | |
| 1,897,144 A | 2/1933 | Prouty | |
| 1,937,765 A | 12/1933 | Leathers | |
| 2,014,287 A | 10/1935 | Newman | |
| 2,143,421 A | 1/1939 | Loehr et al. | |
| 2,171,248 A | 9/1939 | Van Berkel | |
| 2,267,764 A | 12/1941 | Taylor | |
| 2,300,266 A | 10/1942 | Smellie | |
| 2,392,872 A | 1/1946 | Wolfe | |

(Continued)

FOREIGN PATENT DOCUMENTS

CA 54488 5/1985

(Continued)

*Primary Examiner*—Robert A. Hopkins
(74) *Attorney, Agent, or Firm*—Philip C. Mendes da Costa; Bereskin & Parr

(57) ABSTRACT

A method for filtering a dirty air stream in a vacuum cleaner to obtain a clean air stream comprises subjecting the dirty air stream to a first cyclonic separation stage to obtain a partially cleaned air stream and subjecting the partially cleaned air stream to an electronic filtration stage and optionally a second cyclonic separation stage to obtain the clean air stream. The electronic filtration stage is optionally removable with a cyclonic cleaning stage from the vacuum cleaner. The electronic filtration stage is optionally an electrostatic precipitator which utilizes air flow through the vacuum cleaner to generate the voltage used by the electrostatic precipitator.

17 Claims, 9 Drawing Sheets

U.S. PATENT DOCUMENTS

| | | | |
|---|---|---|---|
| 2,397,872 | A | 4/1946 | Kovacs |
| 2,397,980 | A | 4/1946 | Petri |
| 2,402,845 | A | 6/1946 | Rodman |
| 2,405,625 | A | 8/1946 | Whiton et al. |
| 2,595,752 | A | 5/1952 | Batts |
| 2,608,268 | A | 8/1952 | Gerber |
| 2,672,642 | A | 3/1954 | Tamarin et al. |
| 2,681,124 | A | 6/1954 | Van der Kolk |
| 2,822,060 | A | 2/1958 | Udovich |
| 2,993,223 | A | 7/1961 | Krammes |
| D197,459 | S | 2/1964 | Jepson et al. |
| 3,200,568 | A | 8/1965 | McNeil |
| 3,235,090 | A | 2/1966 | Bose et al. |
| 3,283,480 | A | 11/1966 | Szego |
| 3,320,727 | A | 5/1967 | Farley et al. |
| 3,425,192 | A * | 2/1969 | Davis ............ 55/345 |
| 3,501,014 | A | 3/1970 | Fitch, Jr. et al. |
| 3,535,854 | A | 10/1970 | Taylor |
| 3,675,268 | A | 7/1972 | Nordeen |
| 3,853,518 | A | 12/1974 | Tu et al. |
| 3,877,902 | A | 4/1975 | Eriksson et al. |
| 3,925,045 | A | 12/1975 | Cheng |
| 3,955,236 | A | 5/1976 | Mekelburg |
| 4,005,998 | A | 2/1977 | Gorman |
| 4,141,698 | A | 2/1979 | Kihlstedt et al. |
| 4,162,149 | A | 7/1979 | Mekelburg |
| 4,172,710 | A | 10/1979 | Van Der Molen |
| 4,198,290 | A | 4/1980 | Summers |
| 4,251,241 | A | 2/1981 | Bothun |
| 4,251,368 | A | 2/1981 | Colman et al. |
| 4,268,288 | A | 5/1981 | Coombs |
| 4,326,862 | A | 4/1982 | Suzuki |
| 4,345,572 | A | 8/1982 | Suzuki et al. |
| 4,352,681 | A | 10/1982 | Dietz |
| 4,373,228 | A | 2/1983 | Dyson |
| 4,377,882 | A | 3/1983 | Dyson |
| 4,390,426 | A | 6/1983 | Vicard |
| 4,398,928 | A | 8/1983 | Kunsagi |
| 4,443,234 | A | 4/1984 | Carlsson |
| 4,571,772 | A | 2/1986 | Dyson |
| 4,573,236 | A | 3/1986 | Dyson |
| 4,588,423 | A | 5/1986 | Gillingham et al. |
| 4,593,429 | A | 6/1986 | Dyson |
| RE32,257 | E | 10/1986 | Dyson |
| 4,643,748 | A | 2/1987 | Dyson |
| 4,665,582 | A | 5/1987 | Richmond et al. |
| 4,756,729 | A | 7/1988 | Brunnmair et al. |
| 4,826,515 | A | 5/1989 | Dyson |
| 4,853,008 | A | 8/1989 | Dyson |
| 4,853,011 | A | 8/1989 | Dyson |
| D305,269 | S | 12/1989 | Dyson |
| 4,905,341 | A | 3/1990 | Sunagawa et al. |
| 5,062,870 | A | 11/1991 | Dyson |
| 5,078,761 | A | 1/1992 | Dyson |
| 5,090,976 | A | 2/1992 | Dyson |
| 5,101,532 | A | 4/1992 | Dyson et al. |
| 5,145,499 | A | 9/1992 | Dyson |
| 5,160,356 | A | 11/1992 | Dyson |
| 5,254,147 | A | 10/1993 | Finke |
| 5,267,371 | A | 12/1993 | Soler et al. |
| D343,707 | S | 1/1994 | Dyson |
| 5,307,538 | A | 5/1994 | Rench et al. |
| 5,350,432 | A | 9/1994 | Lee |
| 5,558,697 | A | 9/1996 | Dyson et al. |
| 5,564,160 | A | 10/1996 | Luebbering |
| 5,584,095 | A | 12/1996 | Redding et al. |
| 5,591,253 | A | 1/1997 | Altman et al. |
| D382,679 | S | 8/1997 | Dyson |
| 5,755,007 | A | 5/1998 | Dyson |
| 5,779,745 | A | 7/1998 | Kilstrom |
| 5,935,279 | A | 8/1999 | Kilstrom |
| 5,950,274 | A | 9/1999 | Kilstrom |
| 6,003,196 | A | 12/1999 | Wright et al. |
| 6,012,200 | A | 1/2000 | Murphy et al. |
| 6,146,434 | A | 11/2000 | Scalfani et al. |
| 6,168,716 | B1 | 1/2001 | Conrad et al. |
| 6,277,278 | B1 | 8/2001 | Conrad et al. |
| 6,312,594 | B1 | 11/2001 | Conrad et al. |
| 6,334,234 | B1 * | 1/2002 | Conrad et al. ......... 15/347 |
| 2005/0050863 | A1 * | 3/2005 | Oh ............ 55/345 |

FOREIGN PATENT DOCUMENTS

| | | |
|---|---|---|
| CA | 2104136 | 6/1994 |
| CA | 2156069 | 6/1996 |
| DE | 260 776 | 11/1926 |
| DE | 1 251 139 | 9/1967 |
| DE | 34 35 214 | 4/1986 |
| DK | 52195 | 9/1936 |
| DK | 69708 | 8/1949 |
| EP | 0 408 862 | 1/1991 |
| EP | 0 815 788 | 1/1998 |
| EP | 0 836 827 | 4/1998 |
| EP | 0 839 489 | 5/1998 |
| FR | 1 016 090 | 10/1952 |
| FR | 1 037 980 | 9/1953 |
| FR | 1 094 603 | 5/1955 |
| FR | 2 670 137 | 6/1992 |
| GB | 762070 | 12/1950 |
| GB | 2 108 013 | 5/1983 |
| NL | 6 400 783 | 8/1964 |
| SU | 148023 | 3/1961 |
| SU | 148023 | 7/1961 |
| SU | 1042812 | 9/1983 |
| WO | 82 00451 | 2/1982 |
| WO | WO 95/16382 | 6/1995 |
| WO | WO96/22726 | 1/1996 |
| WO | WO96/19936 | 4/1996 |
| WO | WO96/19937 | 4/1996 |
| WO | WO96/19293 | 6/1996 |
| WO | WO96/19294 | 6/1996 |
| WO | WO96/21389 | 7/1996 |
| WO | WO 96/27446 | 9/1996 |
| WO | WO 98/02080 | 1/1998 |
| WO | WO98/27857 | 2/1998 |
| WO | WO 98/10691 | 3/1998 |
| WO | WO98/10691 | 3/1998 |
| WO | WO98/23381 | 4/1998 |
| WO | WO98/02080 | 6/1998 |
| WO | WO 98/23381 | 6/1998 |
| WO | WO98/33424 | 6/1998 |
| WO | WO 98/27857 | 7/1998 |
| WO | WO 98/33424 | 8/1998 |

* cited by examiner

VACUUM CLEANER

This applicatin is a continuation of U.S. application Ser. No. 10/043,337, now allowed, which is a continuation of U.S. patent application Ser. No. 09/478,891 filed on Jan. 7, 2000 which has issued as U.S. Pat. No. 6,383,266 which is a continuation-in-part of U.S. patent application Ser. No. 09/227,712 filed on Jan. 8, 1999 which has issued as U.S. Pat. No. 6,238,451.

FIELD OF THE INVENTION

This invention relates to vacuum cleaners which have a cyclonic separation apparatus. In another aspect, the invention relates to an electrostatic precipitator.

BACKGROUND OF THE INVENTION

Cyclone separators, which are sometimes referred to merely as cyclones, are devices that utilize centrifugal forces and low pressure caused by spinning motion to separate materials of differing density, size and shape. FIG. 1 illustrates the operating principles in a typical cyclone separator (designated by reference numeral 10 in FIG. 1). The following is a description of the operating principles of cyclone separator 10 in terms of its application to removing entrained particles from an air stream in a vacuum cleaner.

Cyclone separator 10 has an inlet pipe 12 and a main body comprising upper cylindrical portion 14 and lower frusto-conical portion 16. The particle laden air stream is injected through inlet pipe 12 which is positioned tangentially to upper cylindrical portion 14. The shape of upper cylindrical portion 14 and frusto-conical portion 16 induces the air stream to spin creating a vortex. Larger or more dense particles are forced outwards to the walls of cyclone separator 10 where the drag of the spinning air as well as the force of gravity causes them to fall down the walls into an outlet or collector 18. The lighter or less dense particles, as well as the air medium itself, reverses course at approximately collector G and pass outwardly through the low pressure centre of separator 10 and exit separator 10 via air outlet 20 which is positioned in the upper portion of upper cylindrical portion 14.

The separation process in cyclones generally requires a steady flow free of fluctuations or short term variations in the flow rate. The inlet and outlets of cyclone separators are typically operated open to the atmosphere so that there is no pressure difference between the two. If one of the outlets must be operated at a back pressure, both outlets would typically be kept at the same pressure.

When a cyclone separator is designed, the principal factors which are typically considered are the efficiency of the cyclone separator in removing particles of different diameters and the pressure drop associated with the cyclone operation. The principle geometric factors which are used in designing a cyclone separator are the inlet height (A); the inlet width (B); the air outlet diameter (C); the outlet duct length (D); the cone height (Lc); the dirt outlet diameter (G); and, the cylinder height (L)

The value $d_{50}$ represents the smallest diameter particle of which 50 percent is removed by the cyclone. Current cyclones have a limitation that the geometry controls the particle removal efficiency for a given particle diameter. The dimensions which may be varied to alter the $d_{50}$ value are features (A)–(D), (G), (L) and (Lc) which are listed above.

Typically, there are four ways to increase the small particle removal efficiency of a cyclone. These are (1) reducing the cyclone diameter; (2) reducing the outlet diameter; (3) reducing the cone angle; and (4) increasing the body length. If it is acceptable to increase the pressure drop, then an increase in the pressure drop will (1) increase the particle capture efficiency; (2) increase the capacity and (3) decrease the underflow to throughput ratio.

In terms of importance, it appears that the most important parameter is the cyclone diameter. A smaller cyclone diameter implies a smaller $d_{50}$ value by virtue of the higher cyclone speeds and the higher centrifugal forces which may be achieved. For two cyclones of the same diameter, the next most important design parameter appears to be L/d, namely the length of the cylindrical section 14 divided by the diameter of the cyclone and Lc/d, the length of the conical section 16 divided by the width of the cone. Varying L/d and Lc/d will affect the $d_{50}$ performance of the separation process in the cyclone.

Due to its intended use, a vacuum cleaners is designed to filter particles of varying sizes from an air stream. With most vacuum cleaners on the market, a filter material such as a paper bag is used to filter the air. The bag will remove from the air stream any particle larger than the size of the pore in the bag. Thus only a single stage of filtration may be employed. However, if a cyclone is used in a vacuum cleaner, then multiple filtration stages may be employed. This is due to the fact that particle sizes which are generally to be filtered by a vacuum cleaner take on a spectrum of values that necessitates that a plurality of cyclonic separators be used in a series. For example, the first cyclonic separator in a series may have a large $d_{50}$ specification followed by one with a smaller $d_{50}$ specification.

For example, in U.S. Pat. No. 3,425,192, a vacuum cleaning assembly was disclosed which used a first frusto-conical cyclone and six secondary cyclones.

More recently, cyclonic technology has been improved and introduced commercially into canister and upright vacuum cleaners. See for example U.S. Pat. No. 4,593,429. This patent discloses a vacuum cleaner design in which sequential cyclones are utilized as the filtration medium for a vacuum cleaner. Pursuant to the teaching of this patent, the first sequential cyclone is designed to be of a lower efficiency to remove only the larger particles which are entrained in an air stream. The smaller particles remain entrained in the air stream and are transported to the second sequential cyclone which is frusto-conical in shape. The second sequential cyclone is designed to remove the smaller particles which are entrained in the air stream. If larger particles are carried over into the second cyclone separator, then they will typically not be removed by the cyclone separator but exit the frusto-conical cyclone with the air stream.

One disadvantage of cyclonic vacuum cleaners is the amount of power which is required to create an air flow sufficient to convey the dirty air through the cyclones at sufficient speeds to maintain the air flowing cyclonically through the cyclones.

SUMMARY OF THE INVENTION

In order to achieve high levels of particle removal, cyclonic vacuum cleaners which are currently on the market incorporate a HEPA™ filter. Such filters are effective in removing small particulate matter from the air stream so that the air which exits the vacuum cleaner is essentially for refiltered. One disadvantage of such HEPA™ filters is that they provide substantial resistance to the flow of air there through. By removing the HEPA™ filter, the pressure drop which occurs during the passage of the air through the filter assembly of a vacuum cleaner may be reduced by, eg., up to 20%. Accordingly, by removing the HEPA™ filter, the flow rate through the vacuum cleaner may be substantially increased and/or the size of the motor may be reduced by eg., up to 20%. However, the amount of particulate matter which will be contained in the dirty air stream will be increased.

The instant invention provides an alternate approach to the use of such HEPA™ filters. Electrostatic filters generally provide minimal resistance to the flow of air and accordingly do not generally provide much of the pressure drop as an air stream passes there through. The electrostatic filter may be designed to remove the same size particles as are removed by the HEPA™ filter which is currently in use. Alternately, the electrostatic filter may be designed to remove even larger particles. Accordingly, by using an electrostatic filter, the pressure drops for a vacuum cleaner may be substantially reduced (compared to a vacuum cleaner using a HEPA™ filter). Further, the electrostatic filter may provide enhanced particle remover compared to even a HEPA™ filter and accordingly the clean air outlet from the vacuum cleaner may produce air which is even cleaner than that which is achieved from commercially available cyclonic vacuum cleaners which even incorporate at HEPA™ filter.

In accordance with the instant invention, there is also provided a vacuum cleaner comprising:
  (a) a dirty air inlet for receiving air containing dirt;
  (b) a clean air outlet spaced for the dirty air inlet;
  (c) an air flow path extending downstream from the dirty air inlet to the clean air outlet; and,
  (d) a filtration assembly positioned in the air flow path, the filtration assembly comprising:
    (i) at least one cyclonic cleaning stage in flow communication with the dirty air inlet and having a partially cleaned air outlet; and,
    (ii) at least one electrostatic precipitator positioned in the air flow path downstream from the at least one cyclonic cleaning stage and upstream of the clean air outlet; and,
  (f) an on board power source comprising at least one battery for operating the vacuum cleaner.

In one embodiment, the at least one cyclonic cleaning stage comprises at least a first cyclonic cleaning stage and a second cyclonic cleaning stage downstream from the first cyclonic cleaning stage.

In another embodiment, the at least one electrostatic precipitator is positioned in the air flow path downstream from the first cyclonic cleaning stage and upstream of the second cyclonic cleaning stage.

In another embodiment, the at least one electrostatic precipitator is positioned in the air flow path downstream from the second cyclonic cleaning stage and upstream of the clean air outlet.

In another embodiment, the first cyclonic cleaning stage comprises one cyclone and the second cyclonic cleaning stage consists of from two to five second cyclones.

In another embodiment, the second cyclonic cleaning stage removes particulate material larger than that which is removed by the at least one electrostatic precipitator.

In another embodiment, the at least one cyclonic cleaning stage comprises a cyclone chamber removably mounted in a housing and the at least one electrostatic precipitator comprises an electrostatic. precipitator removably mounted in the cyclone chamber.

In another embodiment, the cyclone chamber has an air outlet and the electrostatic precipitator is positioned in the air outlet of the cyclone chamber.

In another embodiment, the cyclone chamber has an air outlet and the electrostatic precipitator is removably mounted in the air outlet of the cyclone chamber.

In accordance with the instant invention, there is provided a vacuum cleaner for receiving and cleaning a dirty air stream to obtain clean air comprising:
  (a) first means for cyclonically treating the dirty air stream to obtain a partially cleaned air stream;
  (b) electrostatic precipitation means positioned downstream from the first means for cyclonically treating a dirty air stream; and,
  (c) an on board power supply means comprising battery means for operating the vacuum cleaner.

In one embodiment, the vacuum cleaner further comprises second means for further cyclonically treating the dirty air stream positioned downstream from the first means for cyclonically treating a dirty air stream.

In another embodiment, the electrostatic precipitation means is positioned in the air flow path downstream from the first means for cyclonically treating the dirty air stream and upstream of the second means for further cyclonically treating the dirty air stream.

In another embodiment, the electrostatic precipitation means is positioned in the air flow path downstream from the second means for further cyclonically treating the dirty air stream and upstream of the clean air outlet.

In another embodiment, the second means for further cyclonically treating the dirty air stream removes particulate material larger than that which is removed by the electrostatic precipitation means.

In another embodiment, the first means for cyclonically treating the dirty air stream is removably mounted in a housing and the electrostatic precipitation means is removably mounted with the first means for cyclonically treating the dirty air stream.

In another embodiment, the first means is removably mounted in n the vacuum cleaner.

In accordance with the instant invention, there is also provided an electrostatic precipitator for separating chargeable particulate matter from a fluid stream comprising:
  (a) a housing having at least one fluid inlet and at least one fluid outlet;
  (b) at least one member movably positioned in the housing for generating a high voltage potential in response to the movement of the at least one member in the housing; and,
  (c) a conductive member for transmitting the high voltage potential to particulate matter entrained in the fluid whereby particulate matter is oppositely charged to the at least one member prior to encountering the at least one member and is attracted to the at least one member during passage of the charged particulate matter through the housing.

In one embodiment, the electrostatic precipitator further comprises a directing member to cause the fluid to rotate the at least one member.

In another embodiment, the at least one member and at least a portion of the housing is constructed from a material that will produce a potential difference between the at least one member and the portion of the housing due to frictional contact of the at least one member with the housing as the at least one member moves in the housing due to the flow of fluid through the housing.

In accordance with the instant invention, there is also provided an electrostatic precipitator for separating chargeable particulate matter from a fluid stream comprising:

(a) housing means having fluid inlet means and fluid outlet means;

(b) individual chargeable means movably positioned in the housing means for generating a high voltage potential in response to the movement of the individual chargeable means in the housing means; and, (c) conductive means for transmitting the high voltage potential to particulate matter entrained in the fluid whereby particulate matter is oppositely charged to the individual chargeable means prior to encountering the individual chargeable means and is attracted to the individual chargeable means during passage of the charged particulate matter through the housing means.

In another embodiment, the electrostatic precipitator further comprises a directing means to cause the fluid to rotate the individual chargeable means.

In another embodiment, the individual chargeable means and at least a portion of the housing means is constructed from a material that will produce a potential difference between the individual chargeable means and the portion of the housing means due to frictional contact of the individual chargeable means with the housing means as the individual chargeable means moves in the housing means due to the flow of fluid through the housing means.

As will be appreciated, the electrostatic filter may comprise the portion of the filter assembly of the vacuum cleaner to remove the smaller particles from the dirty air stream. For example, in a vacuum cleaner having first and second cyclonic separation stages, the first cyclonic separation stage is preferably configured to remove the coarsest particles from the air stream and the second cyclonic separation staged is preferably configured to remove the smallest particles from the air stream while the electrostatic filter is designed to remove particles having an intermediate size. Thus, if the second cyclonic separation stage is positioned after the electrostatic filter, then the second cyclonic separation stage may be configured to remove the particles which are not filtered by either the first cyclonic separation stage or the electrostatic filter. As the second cyclonic separation stage need not be designed to remove the finest particulate matter, it may be of a lower efficiency then would otherwise by useable and accordingly may have a larger diameter. By increasing the diameter of second stage cyclones, the pressure drop across each second stage cyclone will be reduced thereby producing a further reduction in the pressure drop which occurs by the passage of air through the filter assembly of the vacuum cleaner and further reducing the power (size of motor) which is required.

If the electrostatic filter is positioned between the first and second cyclonic separation stages, the finest particulate matter is removed prior to the second cyclonic separation stage treatment of the air. The removal of the fine particulate matter prior to this stage prevents this particulate matter from entering the second stage cyclones and contaminating the interior surface of the second stage cyclones.

In a further alternate embodiment, the first and second cyclonic separation stages may be positioned prior to the electrostatic filter.

In a further preferred embodiment, the electrostatic filter is removable so that it may be cleaned, such as by rinsing with water to remove the particulate matter which is collected thereon.

BRIEF DESCRIPTION OF THE DRAWINGS

These and other advantages of the instant invention will be more fully and particularly understood in connection with the following description of the preferred embodiments of the invention in which.

DETAILED DESCRIPTION OF THE PREFERRED EMBODIMENT

The filter assembly of the instant invention may be used in conjunction with any vacuum cleaner. For example, the filter assembly may be used for an upright vacuum cleaner, a canister vacuum cleaner or a central vacuum cleaner or the like. The dirty air stream which is processed using the filter assembly described herein may be collected by, for example, a wand or rotating brush positioned in the head of a vacuum cleaner as is known in the art. Such dirty air streams typically comprise dirt of varying particle sizes entrained in an air stream. It will be appreciated that the invention may also be used with a wet/dry vacuum cleaner.

Figure 1:
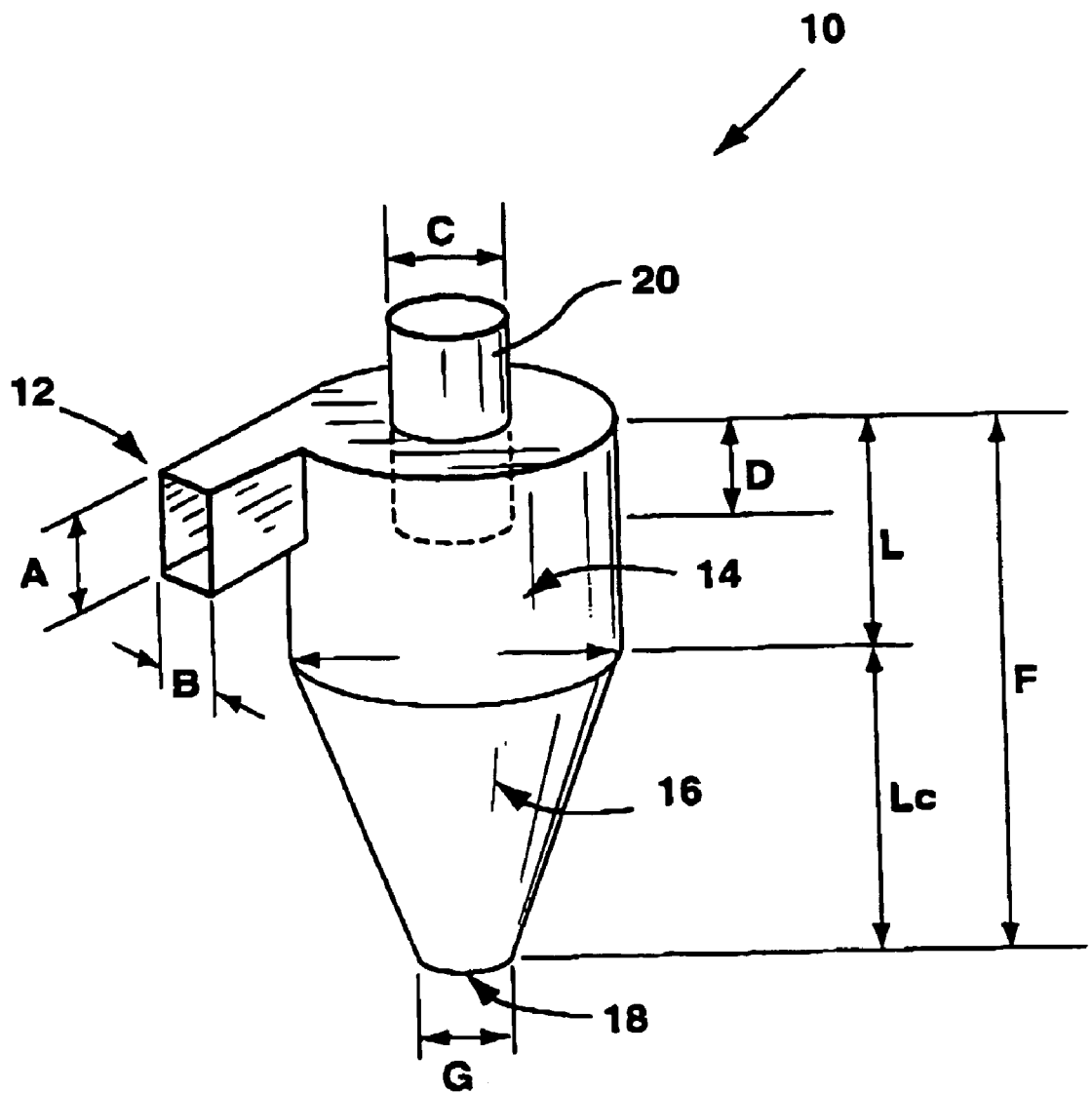
FIG. 1 is a cyclone separator as is known in the art.
Figure 2:
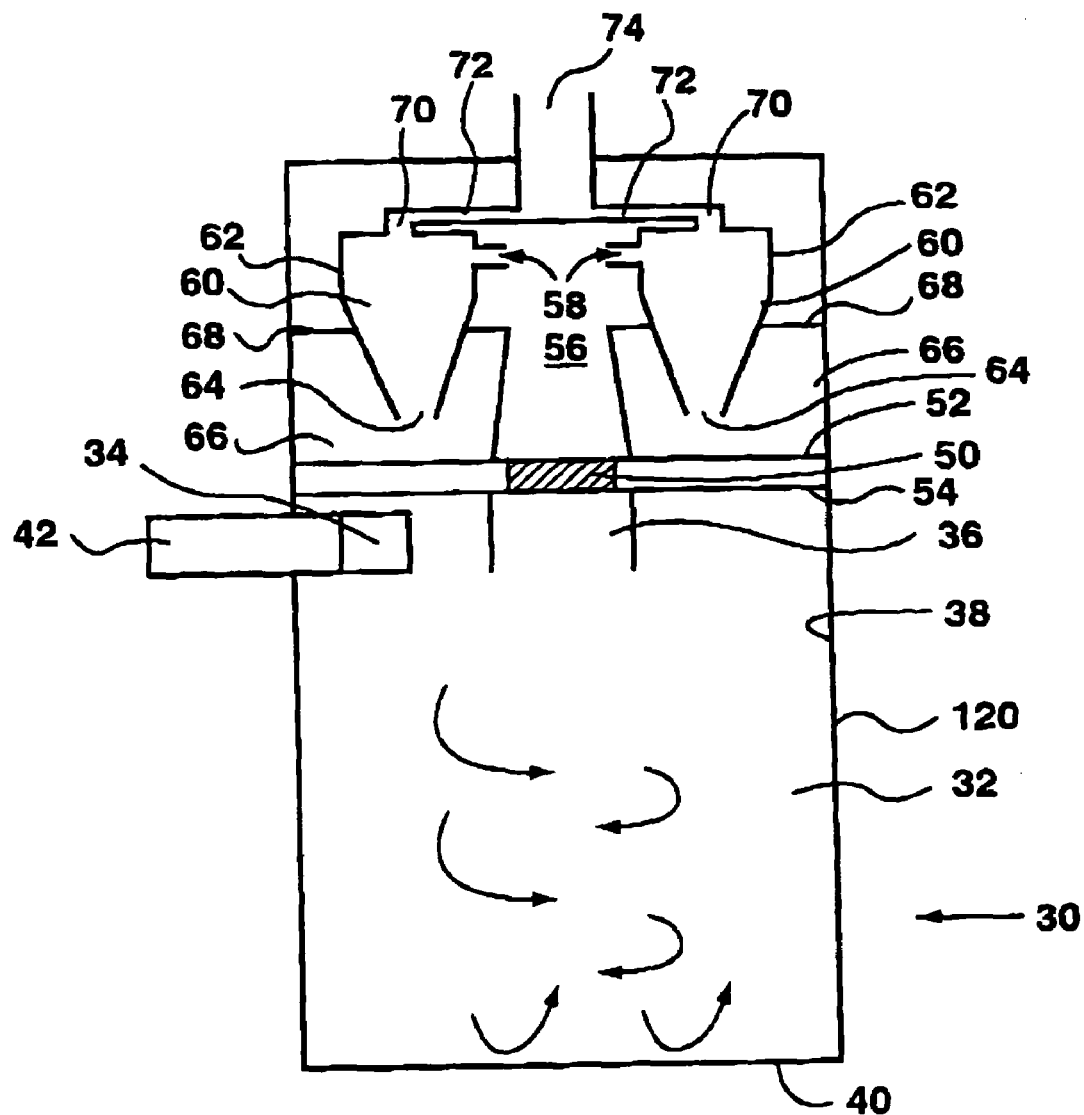
FIG. 2 is a perspective view of a filter assembly for a vacuum cleaner according to the instant invention; and, FIG. 3 is a perspective view of an alternate embodiment of the filter assembly for a vacuum cleaner according to the instant invention.
Figure 3:
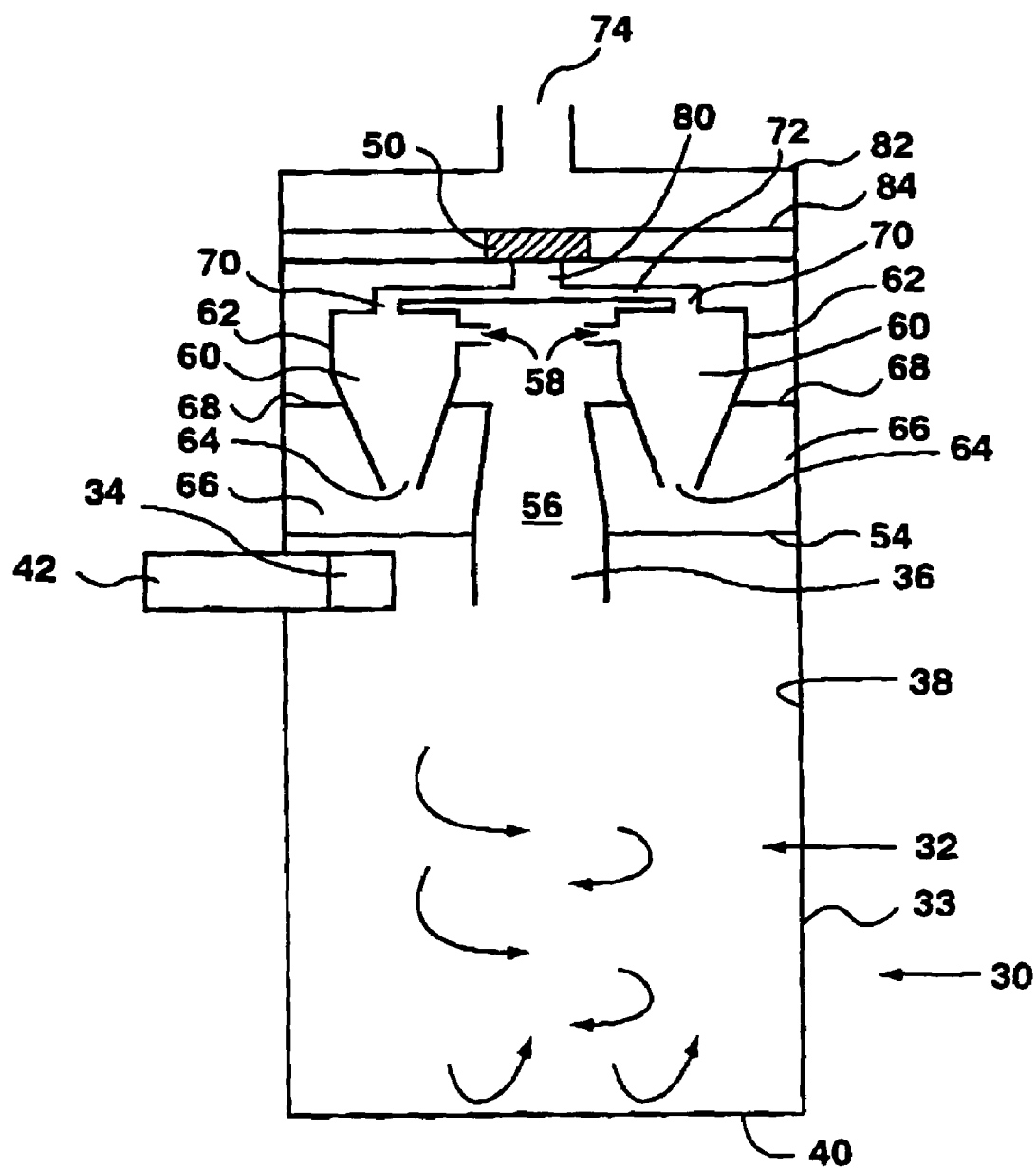
Figure 4:
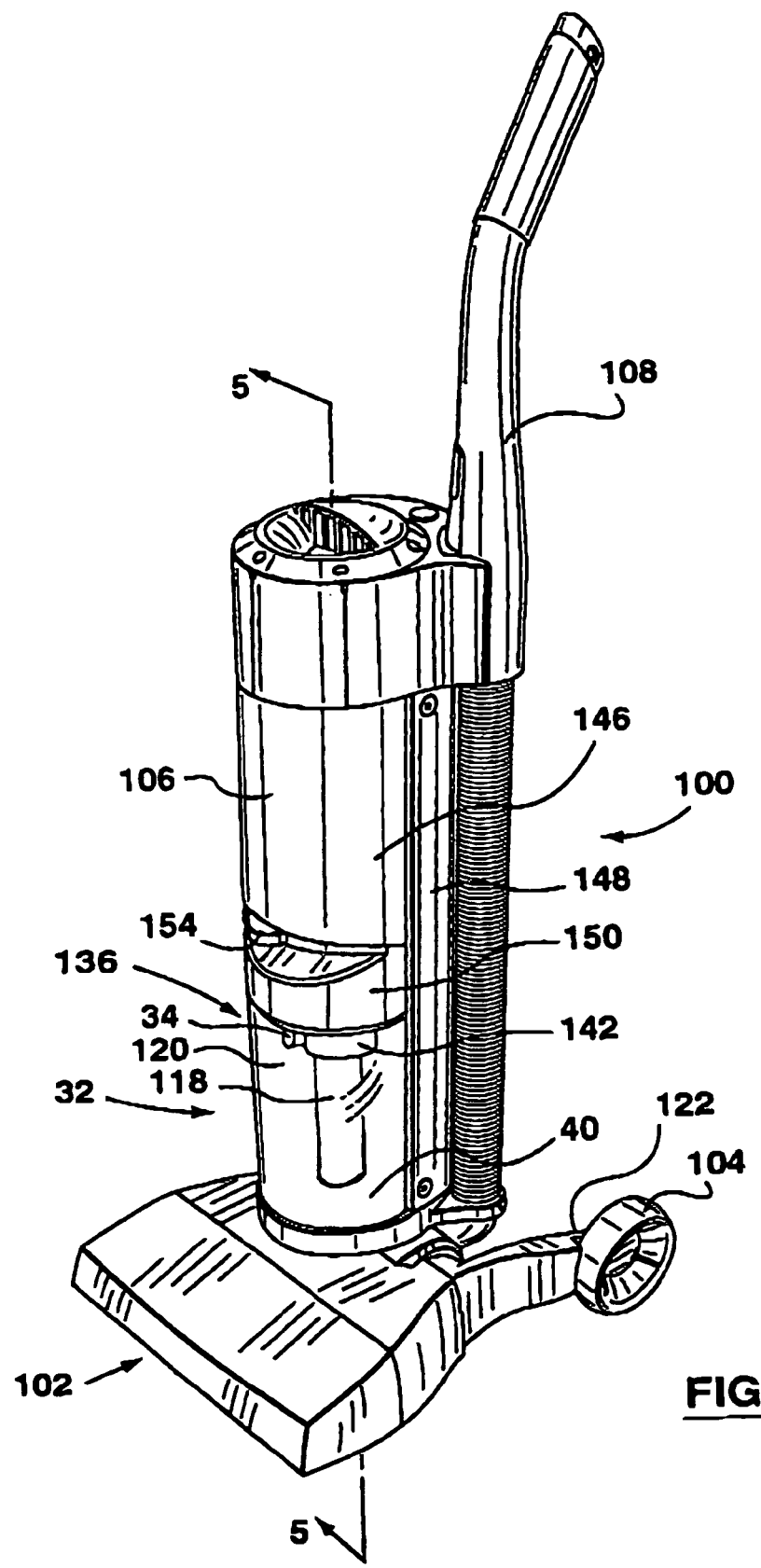
FIG. 4 is a perspective view of an upright vacuum cleaner according to the instant invention.
Figure 5:
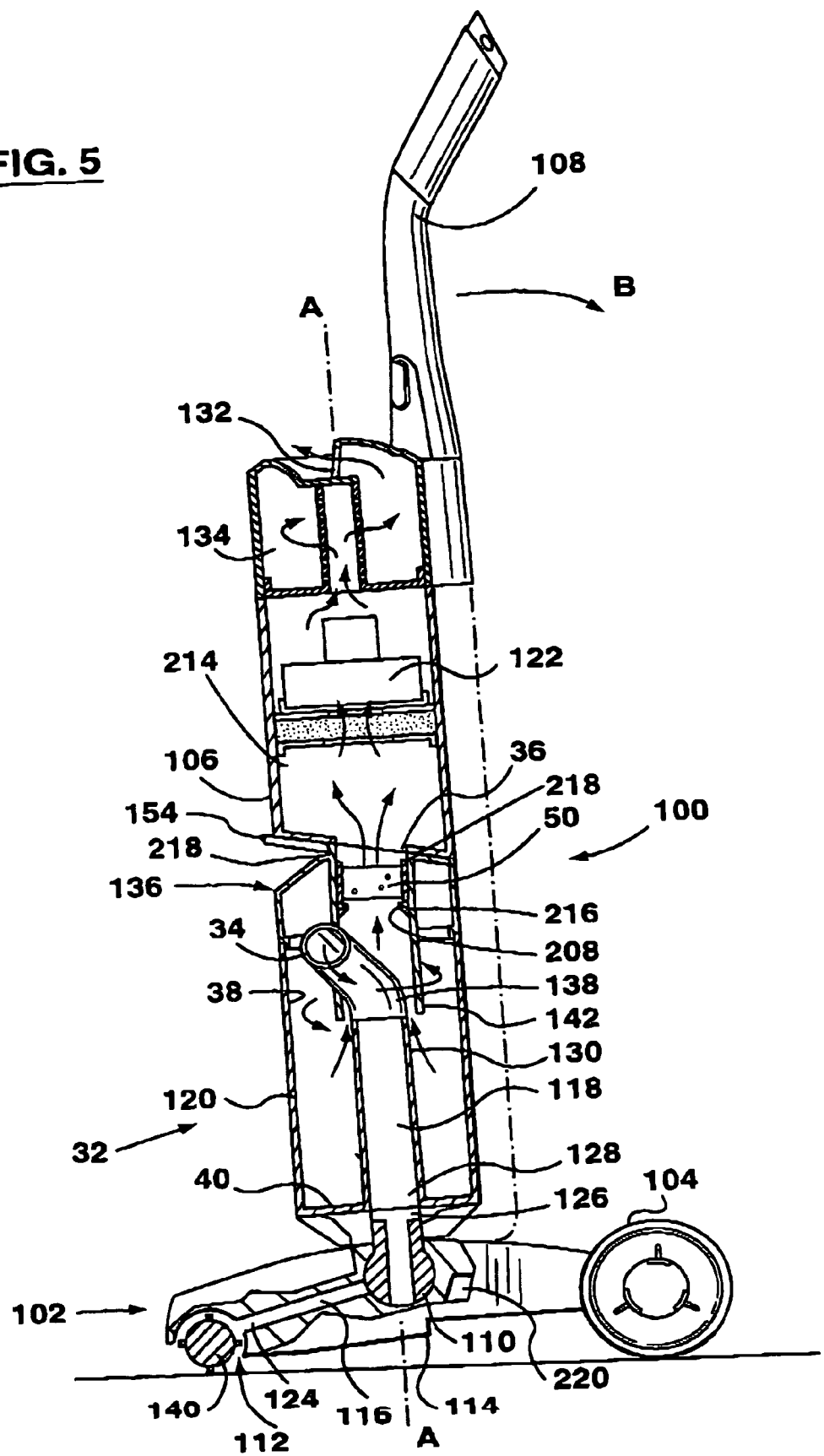
FIG. 5 is a cross-section along line 5—5 in FIG. 4 of the vacuum cleaner of FIG. 4.
Figure 6:
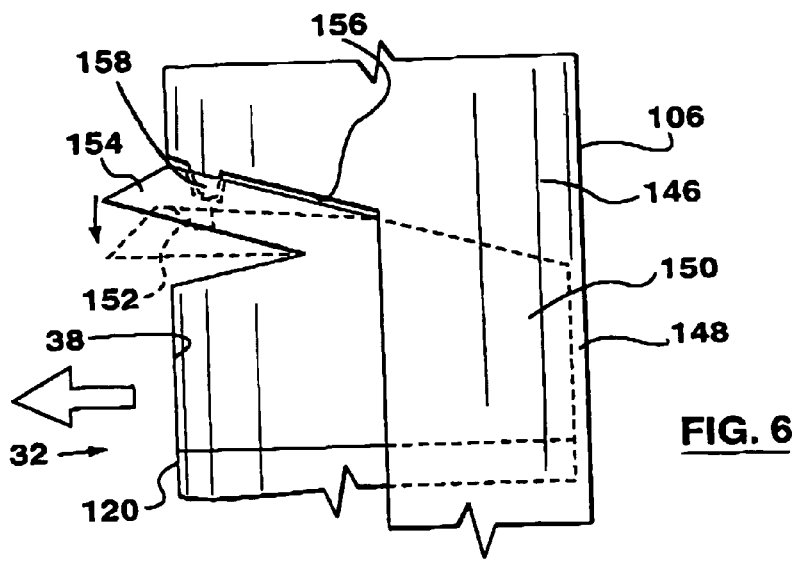
FIG. 6 is an enlargement of the upper portion of the cyclone chamber when positioned in the housing of the vacuum cleaner of FIG. 4.

The filter assembly may be used in conjunction with any design known in the art. For example, as shown in FIGS. 2 and 3, the cyclone may be a cylindrical cyclone having a dirty air feed conduit which is positioned exterior to cyclone bin 120. Alternately, as shown in FIGS. 4 and 5, the cyclone may be a cylindrical cyclone having a dirty air feed conduit which passes longitudinally through cyclone bin 120.

Referring to FIG. 2, the vacuum cleaner has a filter assembly 30 comprising at least one first stage cyclone 32. First stage cyclone 32 may, if desired, comprise a plurality of individual cyclones through which the air passes either in sequence or in parallel. Preferably, filter assembly 30 uses only one first stage cyclone 32 as shown in FIG. 2. Such a single cyclone may be designed to remove approximately 90% or more, preferably at least 95% and most preferably at least 98% of the particulate matter in the air stream entrained by the vacuum cleaner.

The dirty air may be introduced into first cyclone 32 by any means known in the art. In the embodiment of FIG. 2, the dirty air is introduced tangentially into cyclone 32 by inlet 34. As shown in FIG. 2, cyclone 32 may comprise a container or bin 120 having bottom 40 and side walls 38. It will be appreciated that container 120 may be of any particular configuration. As shown in the cross section of FIG. 21, container 120 is cylindrical in shape. Inlet 34 is in communication with the source of dirty air via inlet conduit 42. Inlet conduit 42 may be of any configuration known in the art which will convey the dirty air from a source (eg. a cleaning wand or the floor engaging head of a vacuum cleaner) to inlet 34. The dirty air travels around container 120 towards bottom 40. At one point, the air travels upwardly adjacent the central portion of container 120 to exit cyclone 32 by outlet 36. As shown herein, outlet 36 comprises an annular member which extends downwardly into the upper portion of cyclone 32 so as to prevent the partially cleaned air travelling upwardly through outlet 36 from mixing with the dirty air introduced via inlet 34.

As shown in FIG. 2, the partially cleaned air exiting first stage cyclone 32 via outlet 36 is next passed through an electronic filter 50. Filter 50 may be positioned in air flow communication with outlet 36 in any manner. As shown in FIG. 2, filter 50 is held in position in the air flow path by upper and lower panels 52 and 54.

Container 120 is preferably removable from the vacuum cleaner by any means known in the art. When the container comprising bottom 40 and sidewalls 38 is positioned in the vacuum cleaner, it may abut against lower panel 54 in sealing engagement so as to provide an air tight enclosure but for outlet 36.

The further cleaned air which exits electronic filter 50 passes through outlet 56 to a one or more second stage cyclones 60. The number of second stage cyclones may vary depending upon, inter alia, the type of particulate matter which is to be filtered, the degree of separation which is required and the amount of pressure drop which is acceptable based upon the motor which is provided to the vacuum cleaner. Second cyclones 60 may also be of any particular design known in the art and may be the same or different from first stage cyclone 32. Further, each second stage cyclone 60 need not be the same.

As shown in FIG. 2, each cyclone 62 has an inlet port 58 for introducing air tangentially into the cyclone. Inlet port 58 may be of any particular construction. The air travels through cyclone 60 and dirt which is separated during the passage of air through cyclone 60 exits cyclone 60 via dirt outlet 64. This dirt may be collected in a dirt collection chamber 66. The top of collection chamber 66 is provided by upper plate 68 which forms a seal with wall 62 of cyclone 60. Accordingly, chamber 66 may be defined by upper plate 68, upper panel 52 and the wall of outlet 56. Collection chamber 66 may comprise an annular band extending around the interior of filter assembly 30. Alternately, it may extend only part way around the inner circumference of filter assembly 30 so that a single collection chamber 66 is provided for each cyclone 60. The treated air exits cyclone 60 via outlet 70 which is positioned at the upper end thereof. The treated air may be removed from filter assembly 30 via passage 72 which connects in flow communication with clean air outlet 74.

In the alternate embodiment shown in FIG. 3, filter 50 is positioned downstream from second stage cyclones 60. According to this embodiment, the partially cleaned air exits first stage cyclone 32 via outlet 36 and travels through outlet 56 to inlet 58 to second stage cyclones 60. The treated air exits second cyclone 60 via outlet 70. The treated air is then fed to an electronic filter 50 via, for example, passages 72 which combine to form outlet 80 which is in communication with filter 50. The clean air exits filter 50 and travels outwardly from the filter assembly 30 via clean air outlet 74.

Clean air from clean air outlet 74 may be fed to a motor positioned above clean air outlet 74 and, if desired, to further filtration means, such as additional cyclones (i.e. third stage cyclones), a HEPA™ filter or a further electrostatic filter.

In these embodiments, electronic filter 50 may be of and, particular construction known in the art. Various constructions for electrostatic devices which use charged regions to remove particulate matter from an air stream are known.

In a particular preferred embodiment, electronic filter 50 comprises an electrostatic precipitator. The electrostatic filter is preferably designed to remove the smallest portion of the particulate matter from the air stream (eg. up to 30 microns). However, the actual level of filtration which may be achieved by the electrostatic filter will vary depending upon the design of filter 50.

FIGS. 4 and 5 demonstrate a known cyclone construction for an upright vacuum cleaner as a further alternate embodiment. In this embodiment vacuum cleaner 100 has a floor cleaning head 102, means for moving cleaning head 102 across a floor (eg. wheels 104 which may comprise rear wheels or front and rear wheels), an upper body portion or housing 106 rotatably attached to cleaning head 102, and a handle 108 for moving vacuum cleaner 100 across the floor. A dirty air flow conduit comprising upstream portion 116 in cleaning head 102 and downstream portion in cyclone bin 120 extends from opening 112 in sole plate 114 to inlet 34 of cyclone 32. Upstream portion has an upstream end 124 positioned adjacent brush member 140 or the like and a downstream end 126. Downstream portion has an upstream end 128 and a downstream end 130. A valve means 110 (eg. a rotatable valve as is known in the art) is provided adjacent downstream end 126 in cleaning head 102 so as to connect downstream portion 116 of the dirty air flow conduit in air flow communication with upstream portion 118 of the dirty air flow conduit when housing 106 is rotated rearwardly in the direction of arrow B in which position vacuum cleaner 100 is configured for use for cleaning a floor. In this embodiment, the cyclonic separator means uses one cyclone 32 comprising cyclone bin 120.

Figures 8, 9:
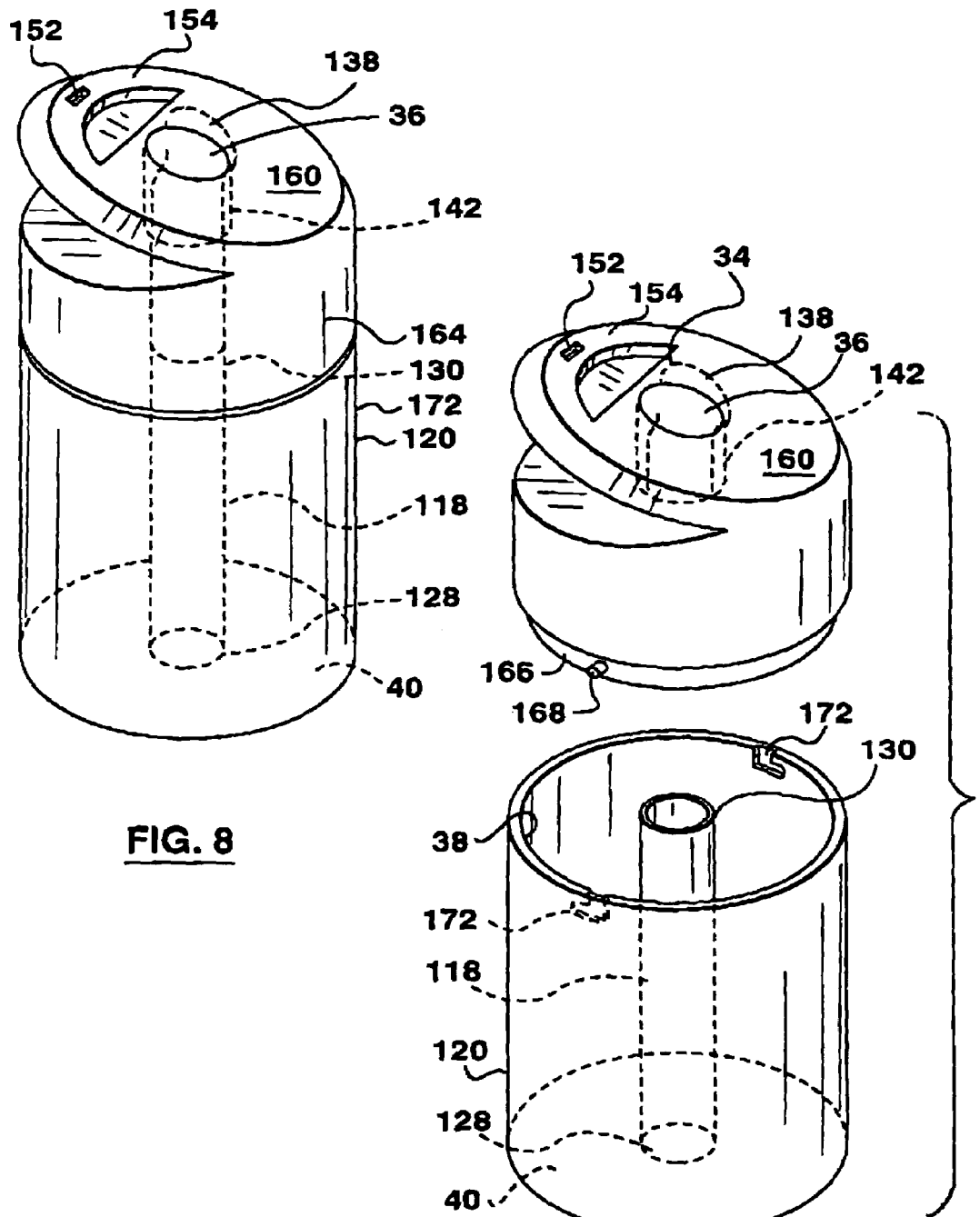
FIG. 8 is a perspective view of the cyclone chamber when removed from the housing of the vacuum cleaner of FIG. 4.
FIG. 9 is an exploded view of the cyclone chamber of FIG. 8.

Cyclone bin 120 has an air inlet 34, preferably at upper end 136 thereof, adapted for providing an air flow tangentially to an inner dirt rotation surface or wall 38 of container 120. Air inlet conduit 138 may alternately be configured to provide an axial flow of air to container 120 and opening 34 at the downstream end of air inlet conduit 138 may have vanes to impart cyclonic flow to the air stream. Preferably, air inlet conduit 138 is configured to introduce the air tangentially to container 120. As shown in FIGS. 5 and 8, air inlet conduit 138 includes curved portions for redirecting the air from an axial flow in downstream portion 118 to a tangential flow at inlet 34. Air inlet conduit 138 curves gently from downstream end 130 of downstream portion 118 so as to travel outwardly and generally radially towards inlet 34. More preferably, the change in direction of the dirty air from generally vertical to generally horizontal and from generally horizontal to generally tangential occurs so as to reduce the pressure drop during its travel from downstream portion 118 to container 120.

Figure 7:
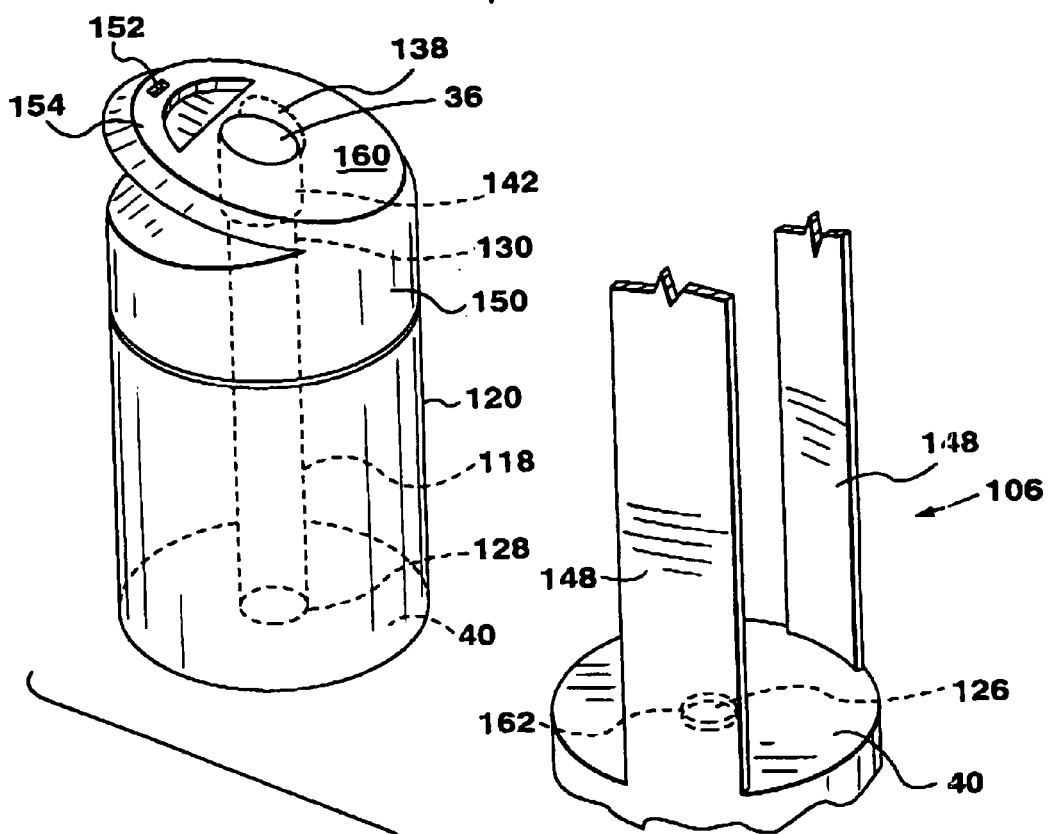
FIG. 7 is an exploded view of the cyclone chamber and housing of the vacuum cleaner of FIG. 4.

Upstream and downstream portions 116 and 118 may comprise a single member (whether integrally formed or connected together to form a continuous flow path) in which case a separated dirt collection means may be positioned below container 120. Alternately portions 116 and 118 may be flexible so as to allow cyclone container 120 to be removed from housing 106 and emptied. In the preferred embodiment of FIGS. 4 and 5, upstream and downstream portions 116, 18 are separate elements and downstream portion 118 is removable with container 120 from housing 106 such that portions 116, 118 are in air flow communication when container 120 is mounted in housing 106 of vacuum cleaner 100. Thus, if a blockage develops in the dirty air flow conduit, by removing container 120 from housing 106 as shown in FIG. 7, portions 116 and 118 may be individually accessed at ends 126 and 128 to clean out the blockage. Preferably ends 126 and 128 are substantially sealed together to prevent air and dirt leaking there from.

Preferably, downstream portion 118 and container 120 are a one piece assembly so that when container 120 is removed from housing 106, downstream portion 118 is automatically removed at the same time. Thus, downstream portion 118 may be manufactured as part of container 120 (such as by moulding it integrally therewith). Alternately, it may be separately manufactured (such as by extrusion) and subsequently affixed to container 120 by any means known in the art (eg. by welding, engagement of male and female engagement members of the like).

In operation, the vacuum fan motor 122 is activated to induce an air flow through vacuum cleaner 100. The air flow causes a partial vacuum to form at end 124. Air, and entrained dirt, is drawn into upstream portion 116, with the aid of brush member 140. The dirty air flow moves vertically in downstream portion 118 to opening 34 in air inlet conduit 138 and is introduced tangentially to container 120. The airflow is then accelerated around wall 38 and proceeds generally downwardly along and around wall 38 until it reaches a position towards bottom 40 of container 120, at which point the air flow travels upwardly through the central portion of cyclone container 120. Wall 142, an extension of outlet 36, may be provided in container 120. Wall 142 assists in preventing the treated air travelling upwardly to outlet 36 from mixing with the dirty air which is introduced into container 120 via inlet conduit 138.

The removability of container 120 from housing 106 of vacuum cleaner 100 is shown by reference to FIGS. 6–9. Housing 106 comprises a base 144, an upper portion 146 and struts 148 which extend between base 144 and upper portion of housing 146 so as to define a cavity within which container 120 is received. It will be appreciated that housing 106 may be of any configuration which provides an area in which bin 120 may be received. For example, it will be appreciated that if vacuum cleaner 100 is a canister vacuum cleaner, that container 120 may extend horizontally, or at any inclined angle to the horizontal and housing 106 may be of any shape within which container 120 may be received.

Container 120 may be lockingly received in housing 106 by any means known in the art. In the preferred embodiment, container 120 is provided with a lid 150 which has a recess 152 provided in handle 154 thereof. Container 120 and lid 150 comprise a cyclone chamber which is removable received in housing 106. Lower surface 156 of upper portion 146 of housing 106 is provided with a protrusion 158 which is receivable in recess 152. By moving handle 154 downwardly to the position shown in dotted outline in FIG. 6, protrusion 158 is removed from recess 152 allowing bin 120 to be removed from base 144 as is shown in FIG. 7. Recess 152 and protrusion 158 are a male and female detent means. It will be appreciated that other male and female detent means or the like which are known in the art may be utilized so that container 120 may be releasably lockingly received in housing 106.

The cleaned air travels upwardly out above container 120 Accordingly, lid 150 is provided with an upper surface 160. Cylindrical wall 142 extends downwardly from upper surface 160. The intersection of upper surface 160 and wall 142 describes opening 36 which is the clean air outlet.

As can be seen in FIG. 8, downstream portion 118 of the dirty air supply conduit is removed from housing 106 with container 120. Sealing means, such as O-ring 104 may be provided to join ends 126 and 128 in air flow communication when bin 120 is replaced in housing 106 so as to prevent any leak or any substantial leak where ends 126 and 128 meet.

Lid 150 may be releasably mounted to container 120 by any means known in the art. Referring to FIG. 9, lower end 164 of lid 150 is provided with a recessed surface 166 having two protrusions 168 provided therein. Upper end 170 of container 120 is provided with bayonet mounts 172 for receiving protrusions 168. Accordingly, once container 120 is removed from housing 106, lid 150 is rotated slightly counter clockwise so as to release the bayonet mount whereby lid 150 may then be lifted from container 120 thus allowing container 120 to be emptied.

Figure 10:
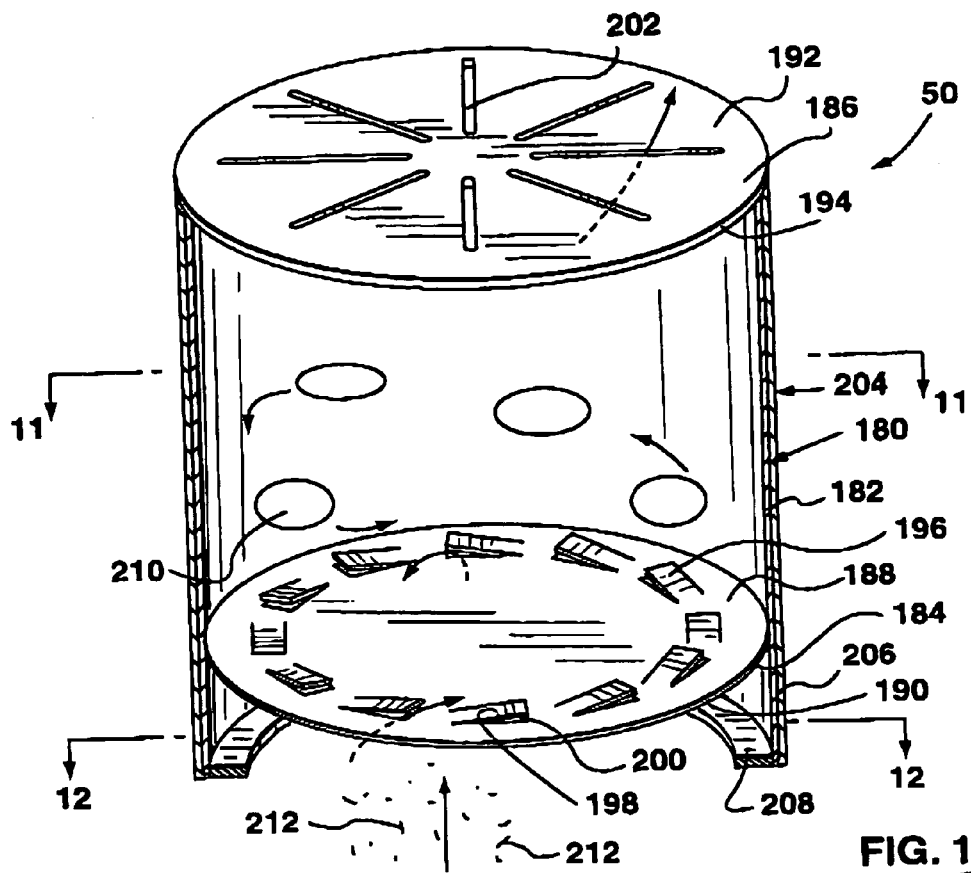
FIG. 10 is a perspective view of an electrostatic precipitator.
Figure 11:
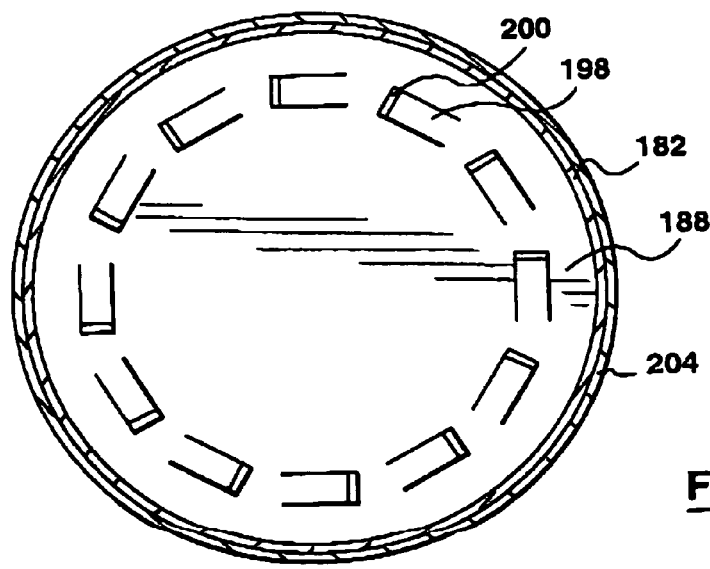
FIG. 11 is a cross-section along line 11—11 in FIG. 10 of the electrostatic precipitator of FIG. 10; and, FIG. 12 is a cross-section along line 12—12 in FIG. 10 of the electrostatic precipitator of FIG. 10.
Figure 12:
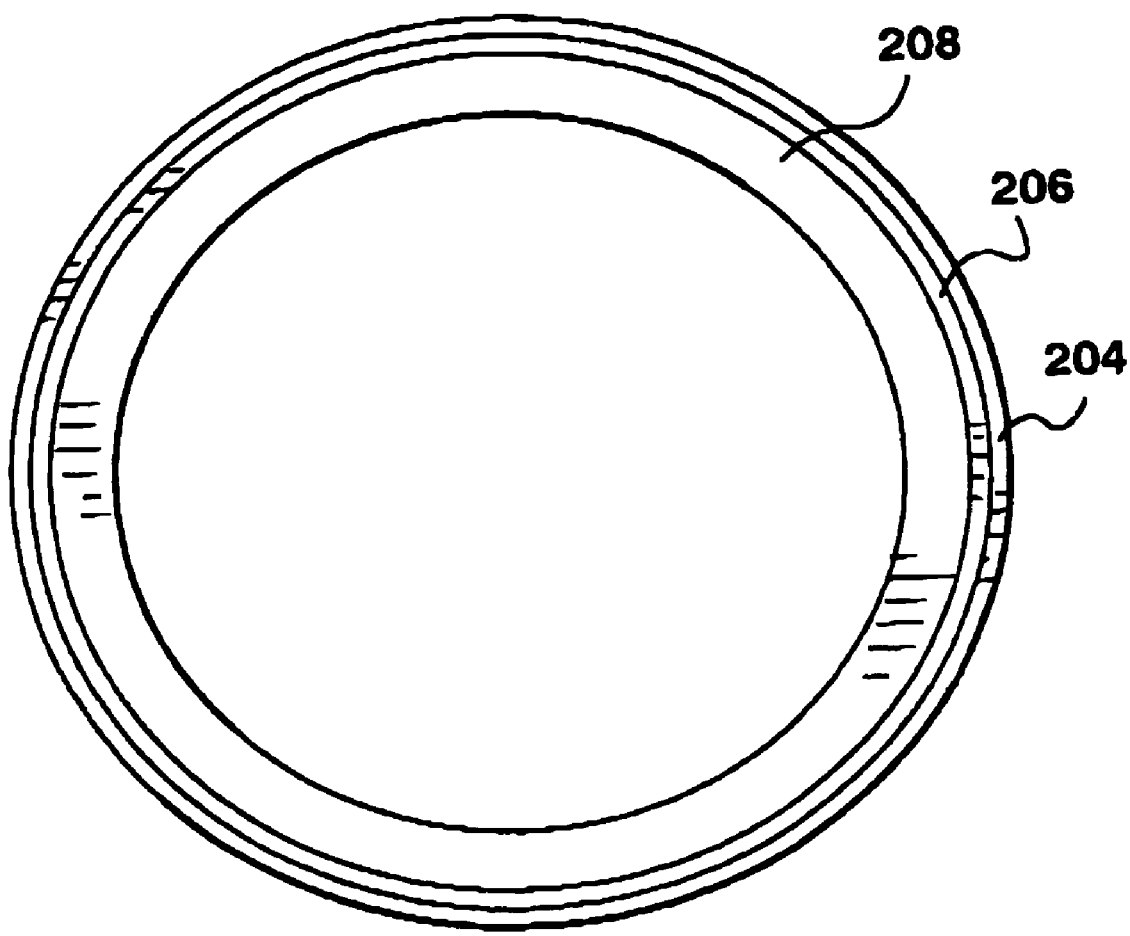

Referring to FIGS. 10–12, a preferred embodiment for an electrostatic filter is shown. In this embodiment, filter 50 is an electrostatic precipitator. In accordance with the instant invention, filter 50 preferably uses air flow and, more preferably, the air flow through filter 50 itself, to generate the electrostatic charge which is utilized by filter 50.

As shown in FIGS. 10–12, filter 50 comprises a container 180 having a plurality of members 210 which rotate therein in response to the flow through chamber 180 of a fluid (eg. air). Accordingly, container 180 may have sidewalls 182, bottom 184 having upper surface 188 and lower surface 190, and top 186 having upper surface 192 and lower surface 194. Top and bottom 184 and 186 may be of any particular configuration that define end walls of container 180. It will be appreciated that while sidewalls 182 are cylindrical as shown in FIG. 10, they may be of any particular shape provided that container 180 has a closed environment for the rotation of members 210. It will further be appreciated that container 180 must have at least one air inlet 196 and at least one air outlet 202 so as to produce movement of members 210 in container 180. Preferably, container 180 has a plurality of air inlets 196 and air outlets 202.

As shown in FIG. 10, air inlets 196 are provided in bottom 184 and air outlets 202 are provided in top 186. It will be appreciated that the openings for air inlets and air outlets 196 and 202 are preferably sized so as not to permit the passage there through of members 210 and are sized and positioned to permit the effective movement of air in container 180 to move members 210 to produce a high voltage potential.

Members 210 and sidewalls 182 are constructed from any material which will generate the high voltage potential and transmit it to conductive layer 204 due to the rotation (eg. cyclonic flow) of members 210 in container 180. Preferably, members 210 are made from styrofoam and walls 182 are constructed from a plastic. The friction of styrofoam balls 210 against one or more of sidewalls 182, bottom 184 and top 186 produce the high voltage potential. It will be appreciated that members 210 may be of any aerodynamic shape the will travel within container 180 to produce frictional engagement with the walls of container 180 due to the air flow there through.

Means is provided to cause members 210 to move within container 180 so that a high voltage potential develops between members 210 and container 180. Preferably, at least one of the air inlets 196, and preferably each of the air inlets 196, are configured so as to cause the air to circulate or rotate within container 180 and entrain members 210. It will be appreciated that directing vanes or the like may also be included with filter 50 (inside or outside container 180) so as to cause the air to circulate within container 180. The vanes, air inlets 196 or the like define means which cause members 210 to move sufficiently within container 180 so as to develop a high voltage potential between members 210 and container 180. In the preferred embodiment of FIG. 10, air inlets 196 comprise a flange 198 which is angled with respect to upper surface 188 of bottom 184. Opening 200 is positioned beneath flange 198. As the air travels towards bottom 184, the air encounters flange 198 and is deflected to rotate within container 180 and entrain members 210.

A conductive layer 204 is provided for receiving and conducting the high voltage potential to electrode means for imparting a corona discharge to particles 212 which are entrained in the air stream travelling towards filter 50. Preferably, the electrode means is positioned upstream from container 180 so as to charge particles 212 prior to their entry into container 180. Referring to FIG. 11, conductive layer 204, which may be a thin layer of a conductive metal, is provided on the exterior surface of sidewalls 182 by any means known in the art. Electrodes 208 are electrically connected to conductive layer 204 by any means known in the art. Preferably, electrodes 208 are electrically connected to conductive layer 204 by means of lower walls 206 to which conductive layer 204 is also applied (see for example FIG. 12).

It will be appreciated that electrodes 208 may be of any configuration that will produce a corona discharge so as to charge particles 212 oppositely to the charge of styrofoam balls 210. As shown in FIG. 10, electrode 208 comprises an inward extension of lower walls 206 so as to impinge on the air flow stream passing towards bottom 184. It will be appreciated that a plurality of electrodes extending transversely across the airflow stream from one side of container 180 to the other may be utilized.

When particles 212 in the air stream come into proximity or in contact with styrofoam balls 210, they are electrostatically attracted to each other as they are oppositely charged. Thus, particles 212 are removed from the air stream and the treated air exits top 186 via outlets 202.

Container 180 may be positioned at any position in the dirty air flow path of the vacuum cleaner. For example, as shown in FIG. 2, it may be positioned downstream from first stage cyclone 32. Alternately, as shown in FIG. 3, it may be positioned downstream from second stage cyclone 60. Referring to FIG. 5, which uses only a single cyclone in the filtration means 30 of vacuum cleaner 100, filter 50 is positioned in cylindrical wall 142 of outlet 36. Accordingly, when cyclone bin 120 is removed from vacuum cleaner 100, filter 50 is automatically removed from vacuum cleaner 100 and is accessible for cleaning. If members 210 are made from a water resistant material (eg. styrofoam), filter 50 may be cleaned by placing filter 50 under a stream of running water (eg. from a faucet). The water passing through filter 50 will remove particulate matter that is electrostatically attracted to members 210. It will be appreciated that filter 50 may also be positioned in cavity 214.

Electrostatic filter 50 may be removably receivably mounted in outlet 36 by any means known in the art. Referring to FIG. 5, wall 142 has angled flange members 216 provided on the inner surface thereof on which electrodes 208 are seated. A locking means, such as a hinged flap or a deformable flange 218 may be used to lockingly hold filter 50 in position when the vacuum cleaner 100 is in operation. It will also be appreciated that a bayonet mount may be utilized. Outlets 202 may be sized to receive a user's fingers in which case outlets 202 may also function as a handle for filter 50. Alternately a handle may be provided on top 186.

In another embodiment, the vacuum cleaner may be powered by battery 220 (see FIG. 5). In particular, it will be appreciated that by using the air flow to move members 210 within container 180, only a minimal amount of power is required to generate a high voltage potential thus permitting the electrostatic precipitator 50 as shown in FIGS. 10–12 to be included in a battery operated appliance.

It will be appreciated that the preferred embodiment of the electrostatic precipitator 50 of FIGS. 10–12 may be used in other applications and need not be confined to use in a vacuum cleaner.

The cleaned air after passing motor 122 may then exit housing 106 via outlet 132 or it may first optionally pass through chamber 134, which may contain a further filtration means (eg. a HEPA™ filter) an a further electrostatic filtration means.

It will be appreciated by those skilled in the art that various additions and modifications may be made to the instant invention and all of these are within scope of the following claims.

We claim:

1. A canister or upright vacuum cleaner comprising:
 a) a vacuum cleaner head having a dirty air inlet;
 b) a first cyclonic stage in fluid flow communication with the dirty air inlet and with a source of suction, the first cyclonic stage having at least one upstream cyclone which has an associated upstream particle collector;
 c) a second cyclonic cleaning stage comprising a plurality of downstream cyclones in parallel which have an associated downstream particle collector, each downstream cyclone having an air exit; and,
 d) a filter positioned downstream from the second cyclonic cleaning stage and in fluid flow communication with each downstream cyclone air exit.

2. The canister or upright vacuum cleaner of claim 1 wherein the downstream cyclone air exits extend to a manifold and the manifold has an air exit which is in fluid flow communication with the filter.

3. The canister or upright vacuum cleaner of claim 2 wherein the filter is a HEPA filter.

4. The canister or upright vacuum cleaner of claim 1 wherein the first cyclonic stage has an air exit and the second cyclonic cleaning stage has an air inlet and the vacuum cleaner further comprises a passage extending from the first cyclonic stage air exit to the second cyclonic stage air inlet.

5. The canister or upright vacuum cleaner of claim 4 wherein the passage narrows in the downstream direction.

6. The canister or upright vacuum cleaner of claim 4 wherein the passage narrows from the first cyclonic stage air exit to the second cyclonic stage air inlet.

7. The canister or upright vacuum cleaner of claim 4 wherein a filter is not positioned in the passage.

8. The canister or upright vacuum cleaner of claim 4 wherein the passage is configured to inhibit particulate matter from settling out in the passage.

9. The canister or upright vacuum cleaner of claim 1 further comprising a single dirt collection chamber for the second cyclonic stage.

10. The canister or upright vacuum cleaner of claim 1 wherein the first cyclonic cleaning stage comprises a single cyclone.

11. A canister or upright vacuum cleaner comprising:
a) a vacuum cleaner head having a dirty air inlet;
b) a first cyclonic stage in fluid flow communication with the dirty air inlet and with a source of suction, the first cyclonic stage having at least one upstream cyclone which has an associated upstream particle collector and an air exit;
c) a second cyclonic cleaning stage comprising an air inlet and a plurality of downstream cyclones in parallel which have an associated downstream particle collector, the downstream cyclones each having an air exit;
d) a passage extending from the first cyclonic stage air exit to the second cyclonic stage air inlet wherein a filter is not positioned in the passage; and,
e) a filter positioned downstream from the second cyclonic cleaning stage.

12. The canister or upright vacuum cleaner of claim 11 wherein the passage narrows in the downstream direction.

13. The canister or upright vacuum cleaner of claim 11 wherein the passage narrows from the first cyclonic stage air exit to the second cyclonic stage air inlet.

14. The canister or upright vacuum cleaner of claim 11 the filter is in fluid flow communication with each downstream cyclone air exit.

15. The canister or upright vacuum cleaner of claim 14 wherein the downstream cyclone air exits extend to a manifold and the manifold has an air exit which is in fluid flow communication with the filter.

16. The canister or upright vacuum cleaner of claim 11 further comprising a single dirt collection chamber for the second cyclonic stage.

17. The canister or upright vacuum cleaner of claim 11 wherein the first cyclonic cleaning stage comprises a single cyclone.

* * * * *

(12) EX PARTE REEXAMINATION CERTIFICATE (7865th)
United States Patent
Conrad et al.

(10) Number: US 7,179,314 C1
(45) Certificate Issued: Nov. 9, 2010

(54) VACUUM CLEANER

(75) Inventors: Wayne Ernest Conrad, Hampton (CA); Helmut Gerhard Conrad, Hampton (CA)

(73) Assignee: Polar Light Limited, Tai Po Ind. Estate, Tai Po NT (HK)

Reexamination Request:
No. 90/009,471, Jul. 15, 2009

Reexamination Certificate for:
Patent No.: 7,179,314
Issued: Feb. 20, 2007
Appl. No.: 10/824,491
Filed: Apr. 15, 2004

Related U.S. Application Data

(63) Continuation of application No. 10/043,337, filed on Jan. 14, 2002, now Pat. No. 6,740,144, which is a continuation of application No. 09/478,891, filed on Jan. 7, 2000, now Pat. No. 6,383,266, which is a continuation-in-part of application No. 09/227,712, filed on Jan. 8, 1999, now Pat. No. 6,238,451.

(51) Int. Cl.
*B01D 45/12* (2006.01)

(52) U.S. Cl. .................. 55/321; 55/337; 55/343; 55/349; 55/459.1; 55/DIG. 3; 15/350; 15/353

(58) Field of Classification Search .......... None
See application file for complete search history.

(56) References Cited

U.S. PATENT DOCUMENTS

| | | | |
|---|---|---|---|
| 1,416,995 A | | 5/1922 | Stroud |
| 2,233,167 A | * | 2/1941 | Holm-Hansen ............ 15/353 |
| 2,553,175 A | | 5/1951 | Davenport |
| 3,425,192 A | | 2/1969 | Davis |
| 6,003,196 A | * | 12/1999 | Wright et al. ............ 15/353 |

FOREIGN PATENT DOCUMENTS

JP 52-14775 U 2/1977

* cited by examiner

*Primary Examiner*—Terrence R Till

(57) ABSTRACT

A method for filtering a dirty air stream in a vacuum cleaner to obtain a clean air stream comprises subjecting the dirty air stream to a first cyclonic separation stage to obtain a partially cleaned air stream and subjecting the partially cleaned air stream to an electronic filtration stage and optionally a second cyclonic separation stage to obtain the clean air stream. The electronic filtration stage is optionally removable with a cyclonic cleaning stage from the vacuum cleaner. The electronic filtration stage is optionally an electrostatic precipitator which utilizes air flow through the vacuum cleaner to generate the voltage used by the electrostatic precipitator.

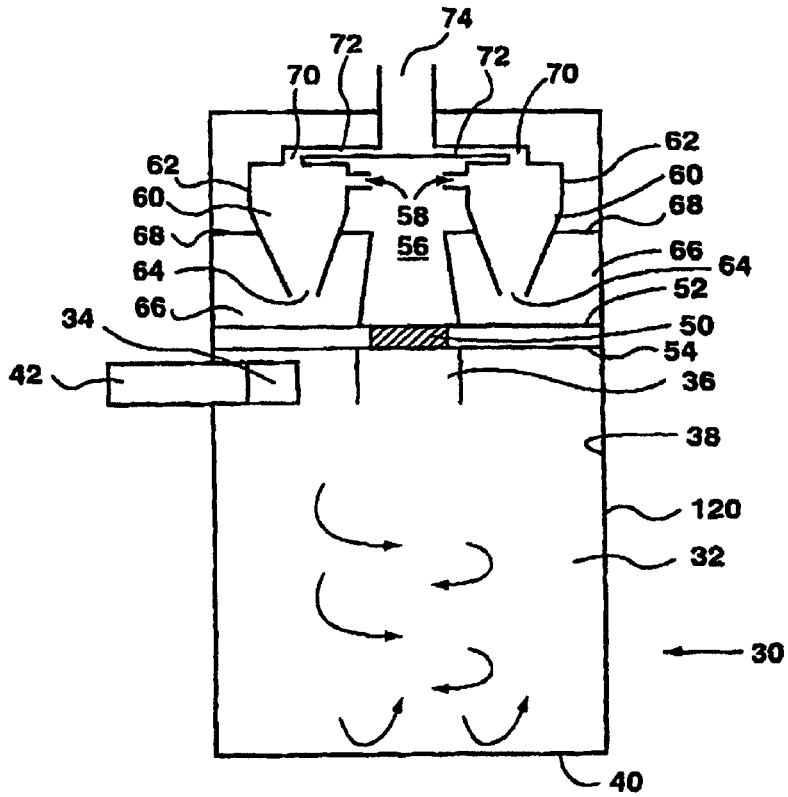

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *